H. G. THOMPSON.
CAR LIGHTING SYSTEM.
APPLICATION FILED AUG. 22, 1908.

1,070,080.

Patented Aug. 12, 1913.
2 SHEETS—SHEET 1.

H. G. THOMPSON.
CAR LIGHTING SYSTEM.
APPLICATION FILED AUG. 22, 1908.

1,070,080.

Patented Aug. 12, 1913.
2 SHEETS—SHEET 2.

WITNESSES

INVENTOR
H. G. Thompson
BY
ATTORNEYS

UNITED STATES PATENT OFFICE.

HARRISON G. THOMPSON, OF GLEN RIDGE, NEW JERSEY, ASSIGNOR TO THE SAFETY CAR HEATING & LIGHTING COMPANY, A CORPORATION OF NEW JERSEY.

CAR-LIGHTING SYSTEM.

1,070,080.      Specification of Letters Patent.      Patented Aug. 12, 1913.

Application filed August 22, 1908. Serial No. 449,825.

*To all whom it may concern:*

Be it known that I, HARRISON G. THOMPSON, a citizen of the United States, residing at Glen Ridge, in the county of Essex and State of New Jersey, have invented certain new and useful Improvements in Car-Lighting Systems, of which the following is a full, clear, and exact description, such as will enable others skilled in the art to which it appertains to make and use the same.

This invention relates to systems of electrical distribution, and, with regard to the more specific features thereof, to the charging of storage or secondary batteries.

One of the objects thereof is to provide simple and practical means for the efficient charging of a storage battery.

Another object is to provide reliable and sensitive means of the above type in which the charging generator is rendered inoperative upon its functions being accomplished.

A further object is to provide automatically acting means adapted to permit the generator to resume action independent of the speed at which the train is running.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
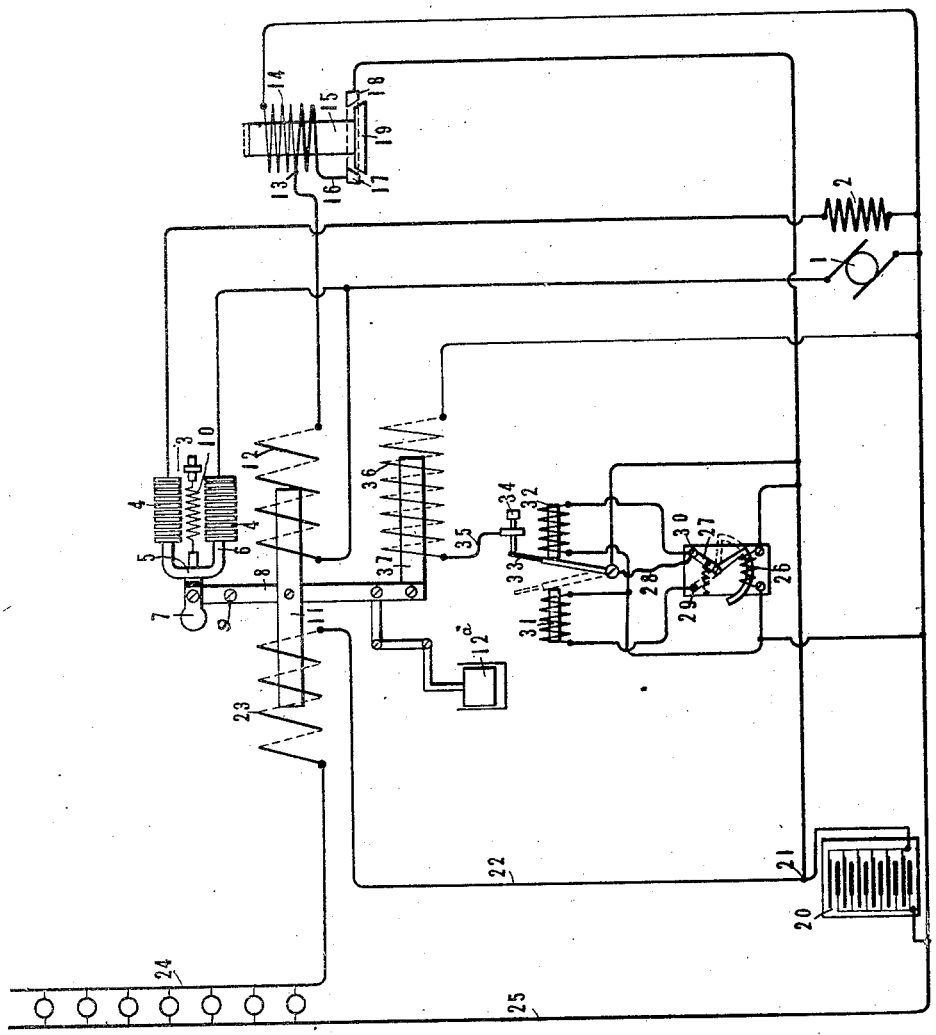
Figure 2:
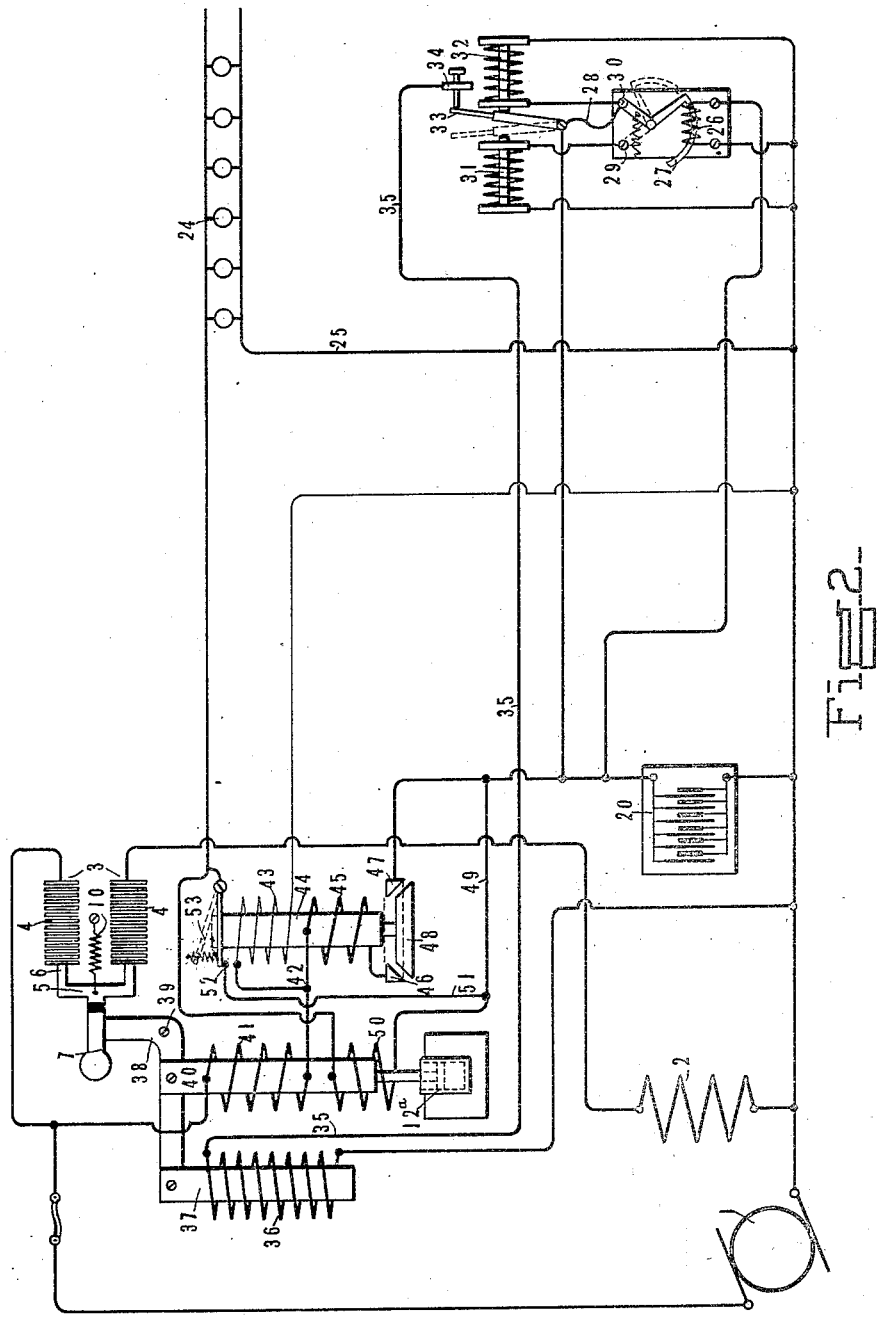

In the accompanying drawing, Figure 1 is a diagrammatic view of one of the various possible embodiments of this invention; and Fig. 2 is a diagrammatic view of a modification thereof.

Similar reference characters refer to similar parts throughout both views.

As tending to render certain features of this invention more readily and fully understood, it may here be noted that I have found that in the charging of storage batteries any current forced through the same after they are fully charged is not only wasted but exerts a harmful effect upon the batteries. When, therefore, the batteries are fully charged, it is desirable to substantially eliminate the charging current, as the batteries are then in condition for efficient service. It is desirable, however, and particularly in the case of generators driven from car axles, that means be provided whereby the generator may resume action whenever necessary and at whatever speed the same may be driven at such time. The attainment of apparatus to accomplish these results without the use of complicated mechanism and yet without sacrifice of sensitiveness in action is among the dominant objects of this invention.

Referring now to Fig. 1, there is shown a generator 1, the field 2 of which has connected therein a variable resistance device 3 comprising in the form here shown, a plurality of sets of carbon disks 4, the aggregate resistance of which is adapted to vary with the pressure imposed thereon. This pressure is controlled by a yoke 5 having a portion 6 conductively connecting the resistance elements and a portion 7 mounted upon a lever 8 pivoted at 9. The position of this yoke is controlled by a spring 10 urging the same in one direction and a core 11 connected to the lever 8 and tending upon the surrounding coil 12 being energized to urge the yoke in the opposite direction, the movement of these parts being retarded by the dashpot 12$^a$. Coil 12 is positioned in the main external circuit of the generator 1 and this circuit is branched at 13 to provide a continuously closed fine wire coil 14 about a core 15. The remaining branch of this external circuit leads through a coil 16 to a terminal 17 adapted to be connected with a terminal 18 by a contact member 19 upon the core 15 being drawn upwardly by the force of the surrounding coils. From terminal 18 a circuit leads through a storage or secondary battery 20 to the remaining pole of the generator. In this manner upon the force of coil 14 reaching a predetermined value depending upon the speed of the train the core 15 is raised, thus closing the circuit through the coil 16 which maintains the switch comprising contact member 19 in closed condition and permits the generator to charge the battery. In the event of the battery voltage exceeding that of the generator, back discharge is prevented by a tendency of the current to reverse in the coil 16, thus acting differentially with respect to the coil 14 and permitting the core 15 to drop. The current, moreover, is maintained substantially constant, due to the fact that any tendency of the same to increase above normal swings the yoke 5 away from the variable resistance media and thus increases the aggregate resistance in the shunt field of the dynamo and cuts down the current output. An abnormally weak current has the opposite effect by reason of the action of the spring 10.

Connected as at 21 with the main external circuit of the dynamo is a conductor 22 leading through a coil 23 surrounding the other end of the core 11 and thence to the lamps or translating devices 24. From the latter apparatus the circuit is completed through conductor 25 to the remaining poles of the battery and of the generator. In this manner, as the load is thrown on, an effect is exerted upon the core 11 due to the current in the coil 23, which substantially neutralizes the effect due to the increased current through the coil 12 which is due to the decrease in resistance of the external circuit of the generator. In this manner the additional current is prevented from having a regulating and reducing effect upon the resistance device 3, and hence the generator is permitted to furnish sufficient current for the lamps without cutting down the charging current for the storage battery. Connected about the terminal battery 20 is a relay comprising a potential or voltmeter coil 26 controlling the position of a relay contact member 27. This member, which is connected as by the conductor 28 with one pole of the battery is adapted alternatively to make connection with the contacts 29 and 30 and respectively excite the magnets 31 and 32 bridged between these contacts and the remaining pole of the battery. Magnets 31 and 32 control the position of a pivoted contact member 33 connected with the conductor 28 and permanently magnetized to rest normally against the core of one or the other of the magnets. In the position shown, the member 33 completes a circuit with a contact member 34 through a conductor 35 and a coil or solenoid 36 and thence to the opposite pole of the storage battery. Coil 36 has movably mounted therein a core 37 connected with the lever 8.

The operation of the mechanism last described is substantially as follows:—During any stage of the charging of the battery before it has reached its full voltage, contact member 33 will be in open circuit position, either by reason of its normal tendency or on account of the closing of the circuit through magnet 31, in the event of the battery potential being low enough to permit the closing of the circuit with the contact 29. Upon the battery, however, being charged to its full voltage, the coil 26 will so affect the contact member 27 as to complete a circuit through the magnet 32 which will in turn complete a circuit through the coil 36. The latter coil will exert a powerful effect upon the lever 8 and swing the same so as to draw the yoke 5 away from the resistance media 4, and materially increase the resistance in the field of the generator. In this manner the current is reduced in the field of the generator and the output thereof reduced or substantially terminated. This action results not only in preventing the generation of useless current, with a corresponding load on the train, but also in the absolute prohibition of any current being forced through the charged cells. The lamps are then operated by the battery, the generator giving no output, thus avoiding waste of current and unnecessary wear upon the parts. When, however, the voltage of the battery falls below a certain predetermined limit, the contact member 27 will complete the circuit through the magnet 31 which will, in turn, open the circuit through coil 36. The yoke 5 is thus permitted to again move toward the variable resistance media 4 and compress the same in such manner as to again build up the field of the generator 1. This action, however, due to the connection of the yoke with the dashpot $12^a$, is gradual, and hence permits the generator safely to resume action, irrespective of the speed at which its armature is being driven. In this manner, the normal charging conditions are again resumed, the regulating mechanism acting to control the current output as above set forth.

In the modification shown in Fig. 2, the generator 1, its field 2 and the variable resistance device 3 are the same as shown in Fig. 1 and are connected in the same manner. In this instance, however, the insulated portion 7 of the yoke is mounted upon a bell crank lever 38 pivoted at 39 and carrying a core 40 about which the coil 41 is wound, said coil being connected in the main external circuit of the generator, which circuit is branched at 42 to provide a continuously closed fine wire coil 43 surrounding a core 44, and the remaining branch of the circuit leads through a coil 45, likewise surrounding the core 44, and to a terminal 46 adapted to be connected with a second terminal 47 by a contact member 48 upon said core being drawn upwardly by the force of the surrounding coil or coils. From the terminal 47 the circuit leads through the storage or secondary battery 20 to the remaining pole of the generator. These circuits are substantially the same as the corresponding circuits shown and described with respect to Fig. 1. A conductor 49 is connected with the main external generator circuit and leads through a coil 50 wound differentially with respect to coil 41 about the core 40 from which it extends to the lamps or translating devices 24 from which the circuit is completed through conductor 25 to the remaining poles of the battery and of the generator in a manner similar to that described with respect to Fig. 1. In this construction, as the load is thrown on a differential effect is exerted upon the core 40, due to the current in the coil 50, which substantially neutralizes the effect due to the increase of the current through the coil 41, due to the decrease in the resistance of the external circuit of the generator. In this manner, the additional current is prevented from having a regulating and reducing effect upon the resistance device 3 and, therefore, the generator is permitted to furnish sufficient current for the lamps without cutting down the charging current of the storage battery. A relay comprising a potential or voltmeter coil 26, contact member 27, magnets 31 and 32, and contact members 33 and 34, is connected to the terminals of the battery 20 in the same manner as already described with respect to Fig. 1, said relay controlling the circuit through the coil 36, which surrounds the core 37, which in this instance is connected with the bell crank lever 38. The operation of this relay and its associated coil is the same as already described with respect to the similar parts shown in Fig. 1. In order that no current from the battery can pass through the coil 50 when the core 44 is in its lowered position, in which position the generator is cut out, a conductor 51 connected to conductor 49 leads to a contact point 52, adapted when the core is in its lowered position to be engaged by a pivoted contact member 53 connected to the conductor which leads to the lamps 24, as shown in full lines in this figure. When the current in the coil 43 reaches a predetermined strength, the core will be drawn upward, as indicated in dotted lines, breaking the short circuit by lifting the contact member 53 from the contact point 52 and allowing the current from the battery to flow through the coil 50. The object of this short circuit device is to permit the generator voltage to pick up when the generator is to be thrown into circuit, which it would not satisfactorily do if the battery current were permitted to pass through the coil 50, as this current would tend to rotate the bell crank lever about its pivot in such a manner as to separate the carbon disks and therefore increase the resistance of the generator field circuit.

It is to be noted that the expression "shunt-wound", with respect to the generator, is used throughout the claims in its well known sense as denoting a generator having a field winding connected substantially across the generator terminals, whereby this winding derives current from the generator whenever the generator is in action.

As many changes could be made in the above construction, and many apparently widely different embodiments of this invention could be made without departing from the scope thereof, it is intended that all matter contained in the above description, or shown in the accompanying drawings shall be interpreted as illustrative and not in a limiting sense. It is also to be understood that the language used in the following claims is intended to cover all of the generic and specific features of the invention herein described, and all statements of the scope of the invention which as a matter of language might be said to fall therebetween.

Having described my invention, what I claim as new and desire to secure by Letters Patent is:

1. In car lighting apparatus, in combination, a shunt wound generator, a storage-battery connected to be charged thereby, a resistance device connected with the field circuit of said generator, means comprising a coil serially connected between said generator and said battery adapted upon the current therein increasing to so affect said resistance as to weaken the generator field and normally to maintain said current substantially constant, a voltage coil positioned and adapted upon being energized to add its effect to said current coil in affecting said variable resistance to weaken said generator field, a circuit in parallel or shunt relation to said voltage coil, and a relay controlled in accordance with the voltage of said battery and adapted to break said shunt circuit and to thereupon cause an effective current to flow in said voltage coil.

2. In car lighting apparatus, in combination, a shunt wound generator, a storage-battery connected to be charged thereby, a variable resistance medium comprising a plurality of contacting members adapted to vary their aggregate resistance with the pressure thereon, said resistance medium being connected with the field circuit of said generator, a member through which pressure is exerted upon said medium, a pivoted bell-crank lever one arm of which is connected with said member, magnetic actuating means connected with the other arm of said lever, means comprising a coil serially connected between said generator and said battery adapted upon the current therein increasing to attract said actuating means and so vary the pressure upon said resistance as to weaken the generator field, and normally to maintain said current substantially constant, said resistance being normally free from other effective electrical influence, a voltage coil coacting with said actuating means and adapted upon being energized to add its effect to said current coil in varying the pressure upon said resistance to weaken the generator field, and voltage controlled means adapted to direct an effective flow of current through said voltage coil.

3. In car lighting apparatus, in combination, a shunt wound generator, a storage-battery connected to be charged thereby, a variable resistance medium comprising a plurality of contacting members adapted to vary their aggregate resistance with pressure thereon, said resistance medium being connected in the field circuit of said generator, a resistance varying device coacting with said medium and tending to compress the same, said device comprising a pivoted bell-crank lever, one arm of which is provided with means coacting with said medium and the other arm of which is provided with actuating means, means comprising a coil serially connected between said generator and said battery adapted upon the current therein increasing to so coact with said actuating means as to decrease the pressure upon said resistance and normally to maintain said current substantially constant, said resistance being normally free from other effective electrical influence, a voltage coil positioned and adapted upon being energized to add its effect to said current coil in decreasing the pressure upon said resistance, and a relay controlled in accordance with the voltage of said battery adapted to control a circuit whereby an effective current is directed through said voltage coil upon said battery reaching a certain state of charge.

4. In car lighting apparatus, in combination, an electric generator, a storage-battery connected to be charged thereby, a variable resistance medium comprising a plurality of contacting members adapted to vary their aggregate resistance with pressure thereon, said resistance medium being connected in the field circuit of said generator, a current coil serially connected between said generator and said battery, a voltage coil connected across the charging circuit, separate movable cores respectively coacting with said coils, and means mechanically connected with said cores and tending normally to compress said medium and adapted upon either of said cores being attracted to tend to weaken the pressure upon said medium.

5. In car lighting apparatus, in combination, an electric generator, a storage-battery connected to be charged thereby, a resistance device connected with the field circuit of said generator, a current coil serially connected between said generator and said battery, a voltage coil, means adapted upon the current in said first coil exceeding normal value to so affect said resistance as to weaken the generator field and thus tend to maintain the current therein substantially constant, means rendered effective upon the battery reaching a certain state of charge adapted to coact with said voltage coil to adapt it to weaken the field of said generator, a lamp-load connected across said battery, a coil connected in series with the lamps and adapted to oppose said first coil in its effect upon said resistance, and means adapted automatically to render ineffective said lamp current coil upon the voltage of said generator becoming less than that of said battery.

6. In car lighting apparatus, in combination, an electric generator, a storage-battery adapted to be charged thereby, lamps connected across said battery, regulating apparatus for said generator comprising a coil connected to be traversed by current flowing to said lamps and adapted to exert a magnetic effect upon the remainder of said regulating apparatus, and means adapted automatically to complete a shunt about said coil upon the voltage of said generator falling below that of said battery.

7. In car lighting apparatus, in combination, an electric generator, a storage-battery adapted to be charged thereby, lamps connected across said battery, regulating apparatus for said generator comprising a coil connected to be traversed by current flowing to said lamps and adapted to exert a magnetic effect upon the remainder of said regulating apparatus, means adapted to disconnect said generator from said battery upon the voltage of the generator falling below that of said battery, and means coacting with said disconnecting means and controlled thereby and adapted to render said coil ineffective upon said generator being disconnected.

8. In car lighting apparatus, in combination, an electric generator, a storage-battery adapted to be charged thereby, lamps connected across said battery, a resistance connected to the field circuit of said generator, means adapted to vary the effect of said resistance and vary the field strength of said generator, a coil adapted to be traversed by current flowing to said lamps and adapted to coact magnetically with said varying means, and means adapted automatically to complete a shunt about said coil upon the voltage of said generator falling below that of said battery.

9. In car lighting apparatus, in combination, an electric generator, a storage-battery adapted to be charged thereby, lamps connected across said battery, a variable resistance medium connected in the field circuit of said generator, a current coil, means comprising a member of magnetic material coacting with said current coil and tending to increase said resistance as said member is attracted, and means adapted automatically to complete a shunt about said coil upon the voltage of said generator falling below that of said battery.

10. In car lighting apparatus, in combination, an electric generator, a storage-battery adapted to be charged thereby, lamps connected across said battery, a variable resistance medium comprising a plurality of contacting members adapted to vary their aggregate resistance with pressure thereon, said resistance medium being connected in the field circuit of said generator, a current coil, a magnetic member positioned in the field of said coil, means coacting with said magnetic member and variable resistance tending to vary the pressure upon said resistance with a variation in current flowing in said coil, and means controlled in accordance with the relative voltages of said generator and said battery and adapted substantially simultaneously to disconnect said generator and shunt said coil.

11. In car lighting apparatus, in combination, an electric generator, a storage-battery adapted to be charged thereby, lamps connected across said battery, a variable resistance medium comprising a plurality of contacting members adapted to vary their aggregate resistance with pressure thereon, said resistance medium being connected in the field circuit of said generator, a current coil, a magnetic member positioned in the field of said coil, means coacting with said magnetic member and variable resistance tending to vary the pressure upon said resistance with a variation in current flowing in said coil, a switch comprising a voltage coil connected across said generator and a movable core having a contact member at one end thereof, said switch being adapted to disconnect said generator by movement of said contact member upon the generator voltage falling below that of said battery, a shunt about said first coil, and means coacting with the remaining end of said core adapted to complete said shunt upon said switch being opened.

12. In car lighting apparatus, in combination, an electric generator, a storage-battery adapted to be charged thereby, lamps connected across said battery, a variable resistance medium comprising a plurality of contacting members adapted to vary their aggregate resistance with pressure thereon, said resistance medium being connected in the field circuit of said generator, a current coil, a magnetic member positioned in the field of said coil, means coacting with said magnetic member and variable resistance adapted to vary the pressure upon said resistance with a variation in current flowing in said coil and tending normally to compress said medium, a switch comprising a voltage coil connected across said generator and a movable core having a contact member at one end thereof, said switch being adapted to disconnect said generator upon its voltage falling below that of said battery by movement of said contact member, a shunt about said first coil, means coacting with the remaining end of said core adapted to complete said shunt upon said switch being opened, a second voltage coil, and means adapted upon said battery reaching a certain state of charge to render said second voltage coil effective in reducing the pressure upon said variable resistance medium.

13. In car lighting apparatus, in combination, a generator having a shunt field winding, a storage battery connected to be charged thereby, a resistance medium operatively connected with the field circuit of said generator, means comprising a coil serially connected between said generator and said battery adapted upon the current therein tending to increase, to so affect said resistance as to weaken the field of said generator and normally to maintain said current substantially constant, said resistance being normally free from other effective electrical influence, a normally ineffective voltage coil adapted upon becoming effective to control said generator current by acting on the resistance of the generator field circuit, and means adapted upon the voltage of said battery attaining a certain value to render said voltage coil effective in controlling said generator current.

14. In car lighting apparatus, in combination, a generator having a shunt field winding, a storage battery connected to be charged thereby, a resistance medium operatively connected with the field circuit of said generator and comprising a plurality of contacting members adapted to vary their aggregate resistance with the pressure thereon, means comprising a coil serially connected between said generator and said battery adapted upon the current therein tending to increase to so vary the pressure upon said resistance as to weaken the generator field and normally to maintain said current substantially constant, said resistance being normally free from other effective electrical influence, a normally ineffective voltage coil positioned and adapted upon being energized to add its effect to said current coil in affecting said variable resistance, and a relay controlled in accordance with the voltage of said battery adapted to control a circuit whereby an effective current is directed through said voltage coil upon said battery reaching a certain state of charge.

15. In car lighting apparatus, in combination, a generator having a shunt field winding, a storage battery connected to be charged thereby, a resistance medium operatively connected with the field circuit of said generator, means comprising a coil serially connected between said generator and said battery adapted upon the current therein tending to increase to so affect said resistance as to weaken the generator field and maintain the generator current substantially constant, said resistance being normally free from other effective electrical influence, a voltage coil adapted upon being rendered effective to co-act with said first coil in varying said resistance and voltage controlled means adapted to direct an effective current through said voltage coil upon said battery reaching a certain state of charge.

16. In car lighting apparatus, in combination, a generator having a shunt field winding, a storage battery connected to be charged thereby, a resistance medium operatively connected with the field circuit of said generator, said medium comprising a plurality of contacting members adapted to vary their aggregate resistance with pressure thereon, means comprising a coil serially connected between said generator and said battery adapted upon the current therein tending to increase to so affect said resistance as to weaken the generator field and maintain the generator current substantially constant, said resistance being normally free from other effective electrical influence, a normally ineffective voltage coil adapted upon being rendered effective to coact with said first coil in controlling the pressure upon said variable resistance and a voltage controlled relay adapted to divert an effective current through said voltage coil upon said battery reaching a certain state of charge.

In testimony whereof I affix my signature, in the presence of two witnesses.

HARRISON G. THOMPSON.

Witnesses:
 G. R. JEWETT,
 E. E. ALLBEE.

---

Copies of this patent may be obtained for five cents each, by addressing the "Commissioner of Patents Washington, D. C."